(12) United States Patent
Bignolles et al.

(10) Patent No.: US 6,504,658 B1
(45) Date of Patent: *Jan. 7, 2003

(54) OPTICAL DEVICE FOR HELMET VISOR COMPRISING ASPHERIC MIRROR

(75) Inventors: Laurent Bignolles, Bordeaux (FR); Laurent Potin, Bordeaux (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/463,405

(22) PCT Filed: Jul. 28, 1998

(86) PCT No.: PCT/FR98/01673

§ 371 (c)(1),
(2), (4) Date: Feb. 1, 2000

(87) PCT Pub. No.: WO99/06867

PCT Pub. Date: Feb. 11, 1999

(30) Foreign Application Priority Data

Aug. 1, 1997 (FR) .............................................. 97 09893

(51) Int. Cl.⁷ ...................... G02B 17/00; G02B 27/14
(52) U.S. Cl. ...................... 359/728; 359/633; 359/730
(58) Field of Search ................................. 359/727, 728, 359/729, 730, 731, 633

(56) References Cited

U.S. PATENT DOCUMENTS

| | | |
|---|---|---|
| 4,084,887 A | 4/1978 | Sigler |
| 5,293,271 A | 3/1994 | Merritt et al. |
| 5,467,480 A | 11/1995 | Baudou et al. |
| 5,479,294 A | 12/1995 | Darrieux et al. |
| 5,517,337 A | 5/1996 | Dupin et al. |
| 5,581,806 A | 12/1996 | Capdepuy et al. |
| 5,623,730 A | 4/1997 | Baudou et al. |
| 5,687,025 A * | 11/1997 | Nanba ........................ 359/633 |
| 5,742,937 A | 4/1998 | Baudou et al. |
| 6,014,769 A | 1/2000 | Baudou et al. |
| 6,078,428 A | 6/2000 | Rambert et al. |
| 6,262,849 B1 * | 7/2001 | Potin et al. .................. 359/631 |

FOREIGN PATENT DOCUMENTS

| | | |
|---|---|---|
| EP | 0 380 035 | 8/1990 |
| EP | 0 531 121 | 3/1993 |
| EP | 0 790 516 | 8/1997 |

* cited by examiner

Primary Examiner—Scott J. Sugarman
(74) Attorney, Agent, or Firm—Oblon, Spivak, McClelland, Maier & Neustadt, P.C.

(57) ABSTRACT

The invention relates to an optical device for a system for presenting collimated images including an off-axis spherical mirror. The device has an additional aspherical mirror whose surface forms, in the plane of symmetry of the unfolded optical system, a curve whose radius of curvature is variable. The surface provides for correction of the image of a pupil of an eye given by the spherical mirror and the pupil image is rectified on the optical axis. The surface may be a paraboloid, an ellipsoid and it may exhibit symmetry of revolution.

21 Claims, 5 Drawing Sheets

OPTICAL DEVICE FOR HELMET VISOR COMPRISING ASPHERIC MIRROR

BACKGROUND OF THE INVENTION

1. Field of the Invention

The present invention relates to an optical device to correct the image of the pupil of the eye given by a spherical concave mirror. More specifically, a device according to the invention can be used to observe an image that is corrected of distortion due to a spherical or substantially spherical concave mirror that is tilted with respect to the direction at which the eye observes this mirror.

2. Discussion of the Background

The invention can be applied to a helmet visor especially but not exclusively for the pilot of an armed aircraft or helicopter or for the operator of a training simulator.

A helmet visor is an image-presenting device that is integrated into a helmet. The visor enables the wearer of the helmet, for example the pilot of an aircraft in flight, to observe visual information simultaneously with the view of the landscape or of the pilot's cabin, which he perceives most usually through a protective visor.

The presentation of appropriate information, for example in the form of symbols, provides assistance in piloting and navigation. Thus, for armed vehicles, the presentation of a reticule provides assistance in the aiming of a weapon.

The information may also consist of an image of the landscape acquired by sensors other than the eye of the helmet wearer such as infrared sensors or visible light intensifiers to complement or replace direct viewing.

Inside the helmet, an image generator comprises an imager, for example a cathode-ray tube screen or a liquid crystal screen on which an image is formed.

The helmet most usually has a relaying optic to convey this image up a combiner which presents the conveyed image in a state where it is superimposed on the view of the landscape.

In order that the pilot may simultaneously observe the landscape which is viewed directly at infinity and the image from the imager, the latter is also focused at infinity by a collimation optic.

When the combiner is formed by a simple semi-reflective flat plate, the collimation of the image can be achieved by an optic placed between the combiner and the imager. A prior art embodiment of this kind has the major drawback of requiring a collimation optic that takes up far too much space in relation to the restricted field of view that is obtained.

To reduce the space requirement, a combiner with optical power has been proposed. A combiner of this kind provides its user with both the collimation of the image and the superimposition of the collimated image on the view of the landscape.

The prior art has a very rich variety of devices comprising a combiner with optical power. First of all, a concave spherical mirror achieves an average quality collimation of an image placed at a particular point in space located on the axis of the mirror and at a distance from this mirror equal to half of its radius of curvature. By placing an imager at this point, the eye located on the axis of the mirror receives rays coming from the imager after they are reflected on the spherical mirror, these rays being parallel and leading to the perception, by the eye, of a collimated image. If, furthermore, the mirror is semi-reflective, it enables the same eye to observe the landscape by transparency. However, in a device of this kind, the imager is on the axis of the semi-transparent spherical mirror and it conceals the field of view of the user.

To clear the user's view, the spherical mirror may be tilted with respect to the normal to his/her face, and the user's eye is no longer on the axis of the mirror. This tilting has the major drawback of leading to a collimated image that is affected by optical aberrations, especially off-centring aberrations, excessively limiting the use of such a device.

In order not to conceal the field of view of the user while at the same time limiting aberrations, the prior art teaches us the use of a parabolic mirror instead of a spherical mirror. The imager is placed at the focal point of the paraboloid described by the mirror and the eye observes the mirror along a parallel to the axis of revolution of the paraboloid.

The collimated image perceived by the eye has no spherical aberration but remains affected mainly by a coma with highly penalizing effects, the extent of which increases very rapidly with the field. Thus, the imager, while being off the axis of the field of view, remains a hindrance in the field of view.

One improvement consists of the exploitation of a double reflection on the parabolic mirror with an intermediate plane mirror placed at the level of the user's forehead and called an onward reflection mirror. The two reflections are located on either side of the axis of the paraboloid. They make it possible to obtain a collimated image that is free of coma and whose other aberrations remain acceptable for a field of view that is still fairly restricted.

The desire to reduce the hindrance due to the onward reflection mirror has led to a development of the prior art. A device using a parabolic mirror and double reflection exhibiting asymmetry with respect to the axis of this mirror has been described. While this device reduces the hindrance in the field of view, it increases the aberrations, especially astigmatism. The device described comprises lenses that are tilted to reduce astigmatism. It also comprises a field lens to compensate for the field curvature and compensates for the distortion by a deformation of the image during its generation: the image is formed on the screen of the cathode-ray tube of the imager with a distortion that is the reverse of that which it is forced to undergo when crossing the optical device.

Furthermore, the initial idea of collimation by a spherical mirror has undergone new developments. Thus, a device has been described with a semi-transparent spherical mirror having a tilted axis, comprising a prism to compensate for the inevitable aberrations induced.

The prism is placed on the path of the light rays between the imager and the spherical mirror. The aberrations are minimized overall by adapting the tilt and aperture of the prism. And the astigmatism is corrected by an additional optical element that must be cylindrical.

This device is essentially penalized by a small field.

In parallel with this, devices have been made with spherical mirrors having no tilt in relation to the axis of view and with a shift of the imager.

A device of this kind has a semi-reflecting plane mirror placed between the spherical mirror and the user's eye, at the focal point of collimation of the spherical mirror.

From the imager to the user's eye, a light ray follows an optical path where, successively, it strikes the semi-reflecting plane mirror a first time, is reflected from this plane mirror towards the spherical mirror, and is then reflected on this spherical mirror and sent back to the plane mirror, it strikes the plane mirror a second time and goes through it to meet the eye.

The collection of spherical and plane mirrors is transparent for rays emitted by the landscape.

This type of device presents a high quality collimated image.

However, this design which implies a compromise between reflection and transmission by the plane mirror, has the drawback of sending to the eye only a small part of the initial light intensity and of thus too severely limiting the conditions of use of a helmet visor fitted out with this device.

The transmission of the useful image to the eye can be improved by slightly tilting the spherical visor with respect to the axis of view of the user and by subjecting a plane mirror to an anti-reflective treatment that is selective as a function of the angle of incidence of the light rays.

With this geometry, the first and second angles of incidence of one and the same light ray on the plane mirror have distinct angular values whereby the selective anti-reflective treatment, by circumventing the standard compromise between the reflection and the transmission of a ray that penalizes the above device, helps the reflection of the initial ray jointly with the transmission of the already reflected ray.

This device has a fairly wide field of view but is affected by aberrations due to the tilting of the axis of the spherical mirror. Certain aberrations are corrected by a tilted field lens and by spherical lenses.

The astigmatism and distortion are not excessive since the tilt is small, but are not corrected optically. Only a compensation of the distortion by a deformation of the image generated on the cathode-ray tube screen can be considered.

This device has improved luminosity, however the presence of the plane mirror between the eye and the spherical mirror most usually integrated into the visor of the helmet is a major drawback were it nor for the comfort and security of the eye on the one hand and for the high cost of its anti-reflective treatment on the other hand.

The problem is to make a device for presenting images for helmets with a spherical visor where there is no element interposed between the eye and the visor and which presents a collimated image that is satisfactory for the user, namely an image that is devoid of troublesome aberrations and has a wide field of view greater than or equal to 40°.

The use of a spherical part of the visor as a collimation element leads to major aberrations which must be corrected at least partially.

This is why the invention proposes an optical device for a system for presenting collimated images to a user comprising an imager and a substantially spherical off-axis concave mirror characterized in that the optical device comprises an optical axis and an aspherical concave mirror tilted on the optical axis, the intersection of the aspherical concave mirror with the plane of incidence of the optical axis being a curve with a variable radius of curvature to correct the distortion of the image presented to the user, said distortion being due to the substantially spherical off-axis concave mirror.

The light rays coming from the centre of the imager form the central field of the imager. The optical axis of the device corresponds to the path of the ray from the central field which passes through the centre of the user's pupil.

The optical axis is most usually a broken line. For example, if the image is presented to the user straight in front of him, the part of the optical axis located between the eye and the spherical mirror is supported by a first straight line normal to the centre of the user's pupil, the optical axis has a break at the intersection of this first straight line with the spherical mirror, and the image that the spherical mirror gives of this first straight line supports the next segment of the optical axis.

The aspherical concave mirror placed between the spherical mirror and the imager is tilted with respect to the optical axis. The surface of the aspherical concave mirror is preferably a second-order or quadratic surface.

If the invention is presented without a folding mirror, it is always possible, after the theoretical positioning of the various optical elements of the invention, to add one or more plane mirrors which introduce no aberration but make it possible to meet the constraints of space requirement, for example so that the device is adapted to the profile of the user's head. An optic presented without folding mirror is called an unfolded optic.

The plane of symmetry of the unfolded optic contains the normal to the entrance pupil of the user's eye and the centre of the spherical mirror.

The intersection of this plane with the aspherical concave mirror is a plane curve with a radius of curvature that is variable such as a non-degenerate conic. The surface of the aspherical concave mirror is used to correct the distortion of the image presented to the user that is due to the off-axis spherical mirror.

BRIEF SUMMARY OF THE INVENTION

In one embodiment of the invention, the optical surface of the tilted aspherical concave mirror is supported by a paraboloid. In another embodiment, the aspherical concave surface rests on an ellipsoid.

The surface of the aspherical concave mirror is preferably a part of a surface of revolution. In this case, it has the advantage of being easier to make.

The axis of revolution of the aspherical concave mirror is located in the plane of symmetry of the unfolded optic.

The off-axis image of the pupil of the eye is the first pupil image of the device, it is tilted with respect to the optical axis. From this first tilted pupil image, the aspherical mirror according to the invention gives a second pupil image rectified on the optical axis.

In the case of a paraboloid of revolution, the axis of revolution of the aspherical concave mirror is substantially parallel to the normal to the first pupil image.

The device also comprises a power lens substantially centred and placed between the spherical mirror and the aspherical concave mirror.

When the surface of the aspherical concave mirror is described by a paraboloid, the power lens conjugates the image of the pupil of the user's eye, given by the spherical mirror, in the vicinity of the focal point of conjugation of the paraboloid.

The ellipsoid has the advantage of having two focal points at finite distance. A surface of this kind is less easy to machine than a paraboloid but it achieves better correction because the ellipsoidal mirror is completely stigmatic for its two focal points and provides efficient conjugation of the vicinities of the focal points.

The invention has the advantage of correcting the distortion of the image presented to the user's eye for a wide instrument pupil, for example with a diameter of at least 15 millimetres, and for a wide field typically greater than 40°.

The instrument pupil is the zone of space in which the user of the instrument has to place the pupil of his eye in order to use the instrument.

This correction is particularly beneficial when a distortion cannot easily be imposed at the imager. Indeed, the prior art teaches us that in order to correct the distortion of the image given by an optical assembly, it is necessary to introduce a reverse distortion at the imager by electronic correction. This is easily done when the imager has a cathode-ray tube but this approach is not suited to an imager such as for example a light intensifier which does not have the necessary adjustments of the image.

The invention can be integrated into a helmet visor having a wide instrument pupil and a wide field.

Other features and advantages of the invention shall appear from reading the following detailed description of a particular embodiment made with reference to the following appended drawings in which the optical diagrams are shown unfolded, namely without a plane mirror.

DESCRIPTION OF THE PREFERRED EMBODIMENTS

Figure 1:
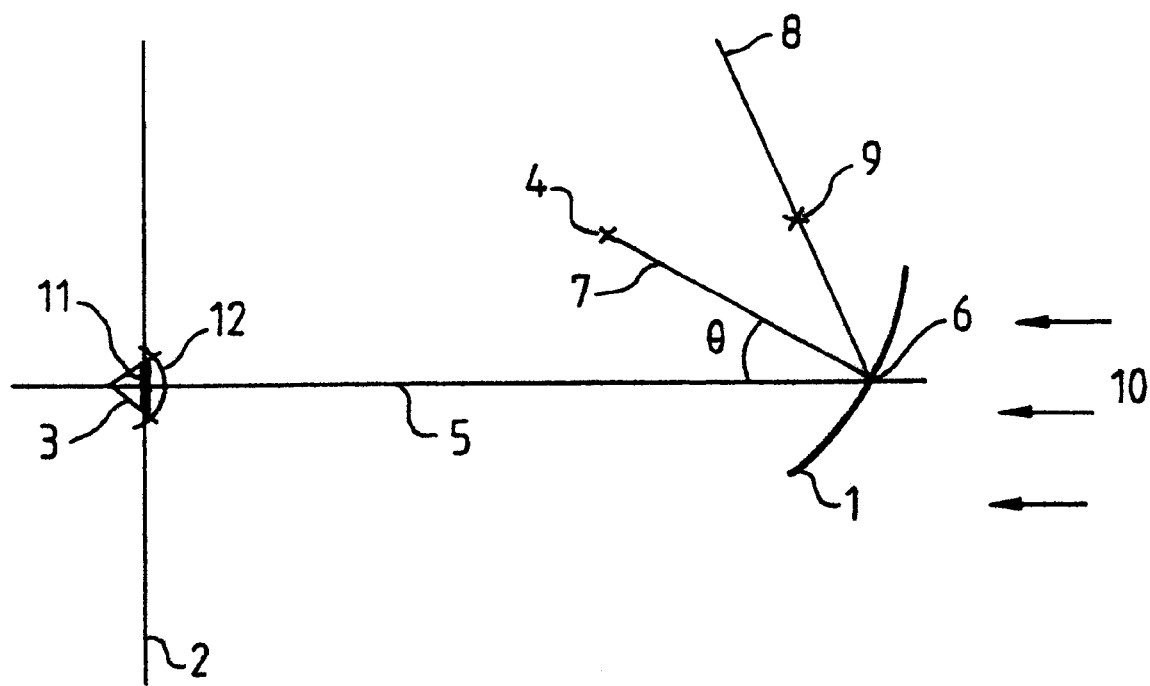
FIG. 1 gives a schematic and partial view of an optical device with an optical off-axis spherical combiner mirror.

In FIG. 1, the user's eye 3 observes a spherical mirror 1. In the position of observation, the pupil plane 2 contains the pupil 11 of the eye, which is generally located 3 millimetres behind the cornea 12 of the eye 3.

A straight line 5 passes through the centre of the pupil of the eye 3 and is for example normal to the pupil plane 2. It is noted that, depending on its orientation with respect to the user's face, the straight line 5 may correspond to the user's view straight ahead or else to an upward or downward view, a view towards one side or a view towards the opposite side.

The spherical mirror 1 is placed in front of the user. Its concavity is turned towards the user, and the surface of this mirror is in the vicinity of its point of intersection 6 with the straight line 5.

The spherical mirror 1 is supported by a sphere S whose centre 4 does not belong to this straight line 5. The plane of FIG. 1 is a plane in space that contains the centre of the supporting sphere of the spherical mirror 1 and the straight line 5 passing through the centre of the pupil of the eye 3. It is the plane of incidence of the straight line 5 on the spherical mirror 1. Most usually, this plane is the same as the plane passing through the centre of the pupil 11 and parallel to the theoretical plane of symmetry of the user's face.

The radius 7 of the sphere S which passes through the point of intersection 6 is distant from the straight line 5 by an angle θ. A non-zero value of this angle θ characterizes an off-axis use of the spherical mirror 1. The spherical mirror 1 itself is said to be "off-axis".

Consider an optical ray 8 which is symmetrical with the straight line 5 of the optical axis with respect to the described radius 7 of the sphere. As a first approximation, an image 9 placed on this optical ray 8 at a distance equal to half of the radius of curvature of the sphere is perceived by the user's eye 3 as being collimated to first order since the light rays coming from the image 9 thus placed are reflected by the spherical mirror 1 towards the eye 3 in the form of a beam of substantially parallel rays. The image 9 may be plane or may exhibit field curvature. The plane tangential to the image 9 is preferably perpendicular to the optical ray 8.

However, the collimation by reflection on the spherical mirror is not perfect. It is affected by spherical aberration, coma, astigmatism, field curvature and distortion as well as off-centring optical aberration due to the off-axis spherical mirror 1. Various optical elements will be described in order to obtain, from a luminous image given by an imager, the perception by the user's eye of a high quality collimated image.

The spherical mirror 1 may be semi-transparent. In this case, light rays 10 coming from the environment external to the spherical mirror 1, namely striking the convex face of this mirror, are transmitted to the eye 3 by the spherical mirror 1. This spherical mirror 1 then constitutes a combiner which superimposes a collimated image on the direct view of the environment.

The central field is defined as the beam of light rays coming from a particular point of the image 9 which is the centre of this image. A particular light ray is considered. This light ray belongs to the central field and passes through the centre of the user's pupil. The path of this light ray is the optical axis of the device used. The optical axis is generally a broken line. The straight line 5 supports a part of the optical axis. Most usually, the image is presented straight ahead of the user, the straight line 5 is then substantially normal to the user's face, but the image may be for example presented at the top of the user's resting field of vision at infinity and the straight line 5 is then oriented in the corresponding direction.

Figure 2:
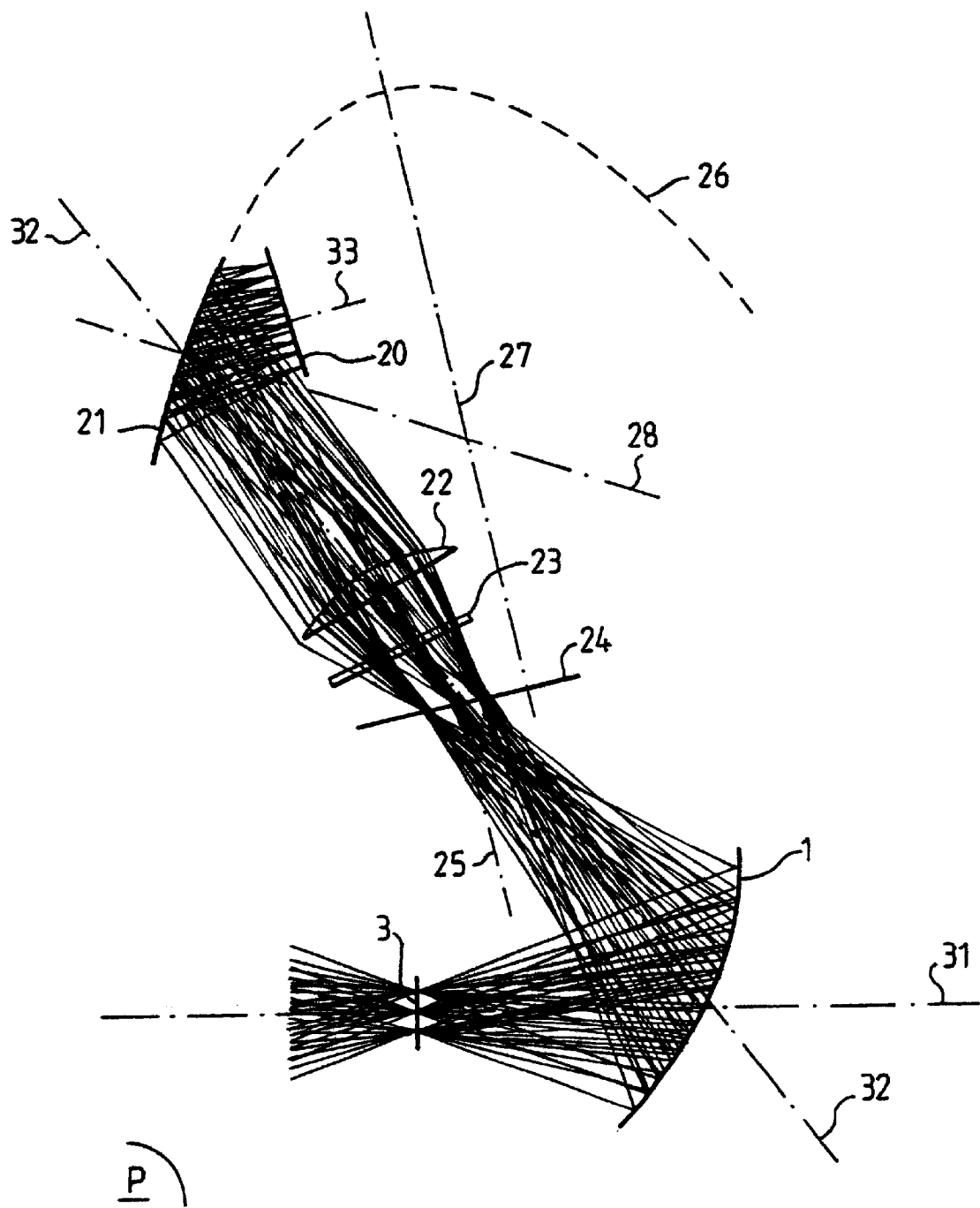
FIG. 2 shows an unfolded device according to the invention.

In FIG. 2, paths of light rays inside an embodiment of a device according to the invention are shown.

In this embodiment, the imager, which is not shown, comprises for example a cathode-ray tube or a liquid crystal screen. The screen may also be embodied, for example, by a section of a bundle of optical fibres or a slide or the screen of a light intensifier tube. An image whose surface is of any kind is displayed on the screen of the imager represented by its tangent plane 20. For example, if the image is plane, it is contained in the tangent plane 20. Hereinafter, for simplicity, the plane 20 designates either the screen of the imager or its tangent plane without distinction. The path of the light rays from the screen of the imager up to the user's eye 3 are plotted for this embodiment of the invention. The user's eye 3 is represented by its pupil which bears the same reference to simplify the figures.

The device has an off-axis spherical mirror 1 and an aspherical concave mirror 21. It also has a power lens 22 located between these two mirrors 1 and 21.

In this embodiment, the optical device has a diffractive lens 23 between the power lens 22 and the spherical mirror 1.

The light rays coming from the screen 20 of the imager strike the aspherical concave mirror 21.

The light rays reflected by the aspherical concave mirror 21 go through the power lens 22 and the diffractive lens 23 and then strike the off-axis spherical mirror 1 which collimates the image received by the user's eye 3.

The path of the light rays is now observed in the other direction, namely going from the user's eye 3 and backtracking through the different optical elements towards the screen of the display. The rays are reflected by the off-axis spherical mirror 1. The particular ray which is the optical axis is also reflected on the spherical mirror 1.

In a first part 31 between the centre of the pupil of the eye 3 and the spherical mirror 1, the optical axis is supported by a straight line 31 which, in FIG. 2, is horizontal. This optical ray is reflected by the spherical mirror 1 at a second part 32 of the optical axis.

The plane of incidence of the optical axis on the spherical mirror 1 is the plane containing the first and second parts 31 and 32 of the optical axis. It is the plane P of FIG. 2.

In the second part 32 of the optical axis, a first pupil image 24 is observed. It is the image of the pupil of the eye 3 given by the off-axis spherical mirror 1. The normal 25 to the plane that is tangential to this first pupil image 24 does not have the same direction as the section 32 of the corresponding optical axis. The first pupil image 24 is tilted on the optical axis.

The power lens 22 is preferably centred on this second part 32 of the optical axis. The power lens 22 is placed for example so that the first pupil image 24 is on the path of the light rays between the spherical mirror 1 and the power lens 22. The assembly of the power lens 22 and the diffractive lens 23 form a power set used to correct the residual aberrations of the image. The power set enables the optical device according to the invention to have high image quality. This power set is an optical element close to the first pupil image 24. It has very little effect on the pupil image 24.

The aspherical concave mirror is placed in the vicinity of the second part 32 of the optical axis, so as to be on the path of the rays that come from the pupil of the eye 1—since here the description is written while backtracking along the real path of the light rays coming from the screen of the imager—and reflect these rays towards the screen 20 of the imager.

The useful part of the aspherical mirror 21 has a tangent plane for which the normal 28 is not parallel to the second part 32 of the optical axis. The aspherical mirror 21 is said to be tilted with respect to this axis.

In the plane P of incidence of the optical axis on the spherical mirror 1 which is defined by the first two parts of the optical axis 31 and 32, the aspherical mirror 21 has a variable radius of curvature.

The device according to the invention shown in FIG. 2 is free of any folding mirror, namely it is presented without any plane mirror. Indeed, plane mirrors do not modify the optical function. They do not introduce and do not correct any aberration but they enable the optical rays to circumvent obstacles such as the user's head. They are not necessary to the description of the invention.

The plane P is the plane of FIG. 2. It is also the plane of symmetry of the optic presented in this figure. The plane P of FIG. 2 is the plane of incidence of the optical axis on the aspherical concave mirror 21. The intersection of the optical surface of the aspherical mirror 21 with this plane P is a plane curve which has a radius of curvature at each of its points. On shifting along the curve, the value of the radius of curvature varies. The value of the radius of curvature is not constant and, depending on the direction of shift, this value increases or else decreases. The variation of the radius of curvature along this curve is said to be monotonic. One example having a simple mathematical expression of such a curve is a part of a non-degenerate conic. The conic is for example a parabola or an ellipse.

The shape of the concave surface of the aspherical mirror 21 is such that the entire device provides for a correction of the aberrations on the image presented to the user which are due to the off-axis spherical mirror.

The aspherical mirror 21 corrects the residual aberrations of the pupil image given by the spherical mirror 1 of the pupil of the eye 3, it is placed in the vicinity of the image of the screen 20 and therefore has but little effect on this image. The aspherical mirror 21 enables the optical device according to the invention to have high pupil quality. The aspherical mirror 21 has little effect on the quality of the image but a great effect on the quality of the pupil.

A second-order or quadratic geometrical surface describes the optical surface of the aspherical mirror 21. A surface of this kind has the advantage of being relatively easy to model since it can be expressed in a suitable reference frame in the form of a second-degree polynomial.

The geometrical surface supporting the optical surface of the aspherical mirror 21 is for example a paraboloid or an ellipsoid.

The geometrical surface is preferably a surface of revolution. It then has the advantage of being fairly easy to manufacture. For the paraboloid and ellipsoid examples, we may then refer to parabolic and ellipsoidal mirrors respectively.

The axis of revolution is preferably in the plane P of FIG. 2 or plane of symmetry of the unfolded optic. The orientation of the axis of revolution is such that the aspherical mirror 21 compensates for the observed tilt of the pupil image 24 that the spherical mirror 1 introduces into the optical device.

In the embodiment of FIG. 2, the geometrical surface is a paraboloid of revolution whose intersection with the plane of FIG. 2 is a parabola 26. The axis of revolution is identical with the axis 27 of the parabola 26. The axis of revolution is preferably directed in the direction of the straight line 25 normal to the tangent plane of the first pupil image 24 given by the spherical mirror 1 of the pupil of the user's eye 3.

The axis 27 and the straight line 28 of the plane P of FIG. 2 which is normal to the centre of the aspherical mirror 21 are not parallel. Their orientations are substantially different. The aspherical mirror 21 corresponds to an off-centred part of a parabolic mirror since the useful surface of the paraboloid is not in the immediate vicinity of the vertex of the parabola 26.

The aperture around the axis 28 is sufficient to optimize the gap that is left available to place, for example, onward reflection mirrors between the aspherical mirror 21 and the lens 22. And the angle of incidence of the optical axis on the aspherical mirror 21 also makes it possible to limit the useful surface and thus to preserve high image quality throughout the surface. The angle of incidence is preferably close to 45°. In this embodiment, the useful surface area of the mirror 21 is estimated for example by a diameter of about 45 millimetres.

Figure 3:
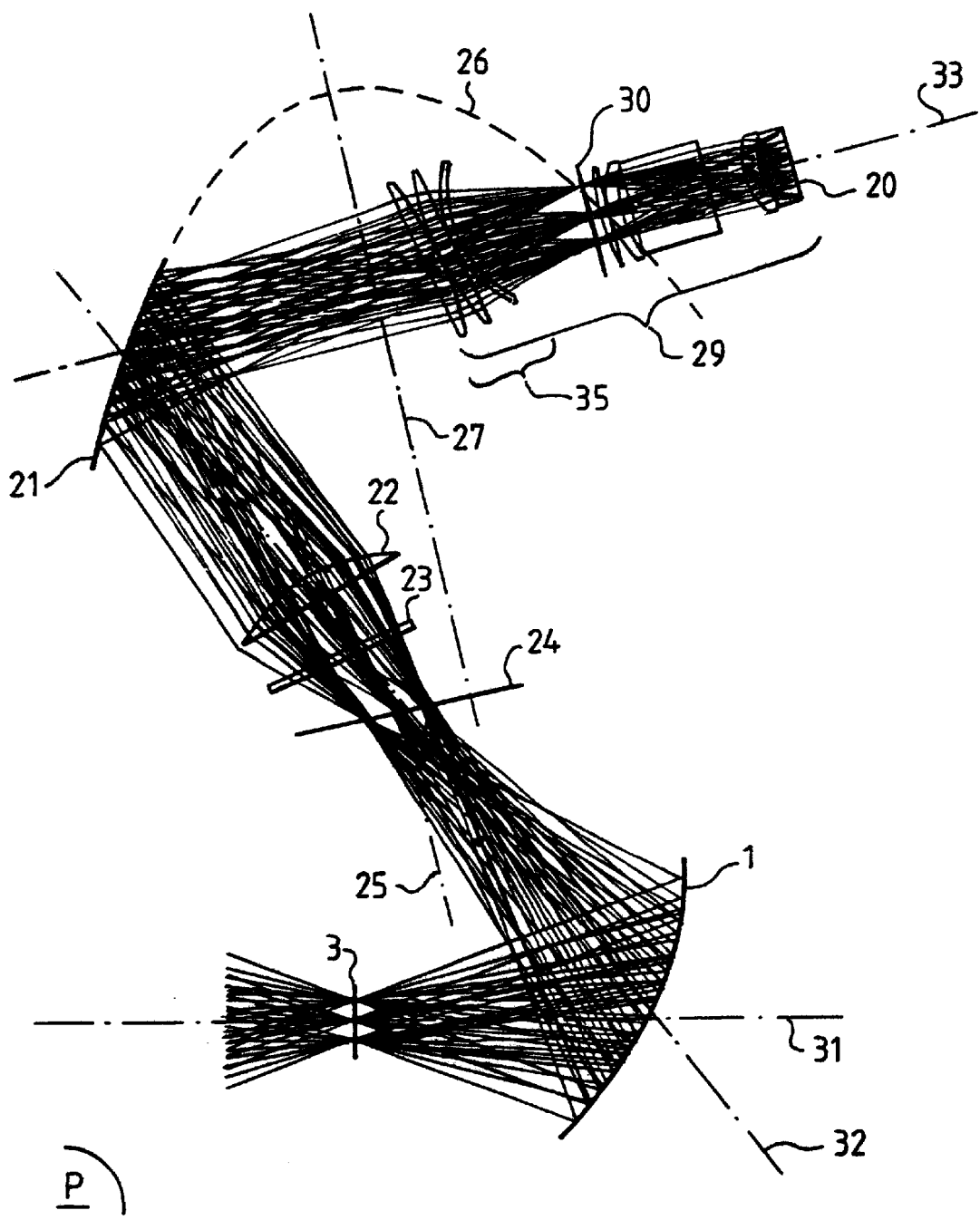
FIG. 3 shows a device according to the invention with a parabolic mirror and a relay optic.

In FIG. 3, an optical device according to the invention has a relay optic 29 to distance the screen 20 of the imager from the aspherical mirror 21. This distancing is generally made necessary to meet constraints of space requirement. It makes it possible for example, for a helmet visor, to place the entire imager, which may be a cathode-ray tube, in a satisfactory position in the available volume of the helmet.

FIG. 3 shows the third part 33 of the optical axis which corresponds to the reflection of the second part 32 of this same optical axis on the aspherical mirror 21. The relay optic 29 is placed between the aspherical concave mirror 21 and the screen 20 of the imager. It is substantially aligned with the third part 33 of the optical axis. This essentially centred relay optic is simple to make.

A second pupil image 30 can be observed on the part 33 of the optical axis. This image is located between the aspherical mirror 21 and the screen of the imager 20. This second pupil image 30 is seen by the aspherical mirror 21 through a set 35 of lenses belonging to the relay optic 29.

The paraboloid of revolution has two focal points, one at infinity and the other at a finite distance from its vertex. The aspherical mirror 21 is preferably placed so that the pupil images 24, 30 are perceived by the aspherical mirror 21 respectively through the power set 22, 23 and the lenses 35 as being located at the level of its focal points. The first pupil image 24 corresponds to the focal point at infinity. It is said that the first image 24 of the pupil of the user's eye given by the spherical mirror 1 is seen by the aspherical mirror 21 through the power set 22, 23 in a conjugate manner.

More specifically, the pupil image 24 is not quite placed optically at infinity with respect to the parabolic mirror 21 since this would lead to an excessively large size for the power lens 22. The embodiment described here by way of an example corresponds to sufficient optical distancing between the aspherical mirror 21 and the first pupil image 24.

Furthermore, the magnification between the two pupil images 30 and 24 preferably has a value close to one. The pupil conjugation practically equal to one has the advantage of reducing the space requirement of the optical device. It enables the size of the optics to be minimized all along the optical path. This reduction of space requirement is advantageous for the weight of the device and for its cost.

The pupil image 30 has a tangent plane that is substantially normal to the local optical axis 33. This is a correction made by the aspherical mirror 21. Indeed, the first image 24 of the pupil of the eye formed by the spherical mirror 1 is tilted with respect to the local optical axis 32 and corresponds to the aberrations induced by this mirror 1. The second pupil image 30 is rectified with respect to the optical axis 33 by the aspherical mirror 21.

The surface of the aspherical mirror 21 is such that this mirror 21 rectifies the pupil image with respect to the optical axis. This rectification enables compensation for the distortion introduced by the off-axis spherical mirror 1. This rectification of the pupil image corresponds to the correction of the pupil spherical aberration. It reduces the distortion of the image observed by the user of a device according to the invention.

Figure 4:
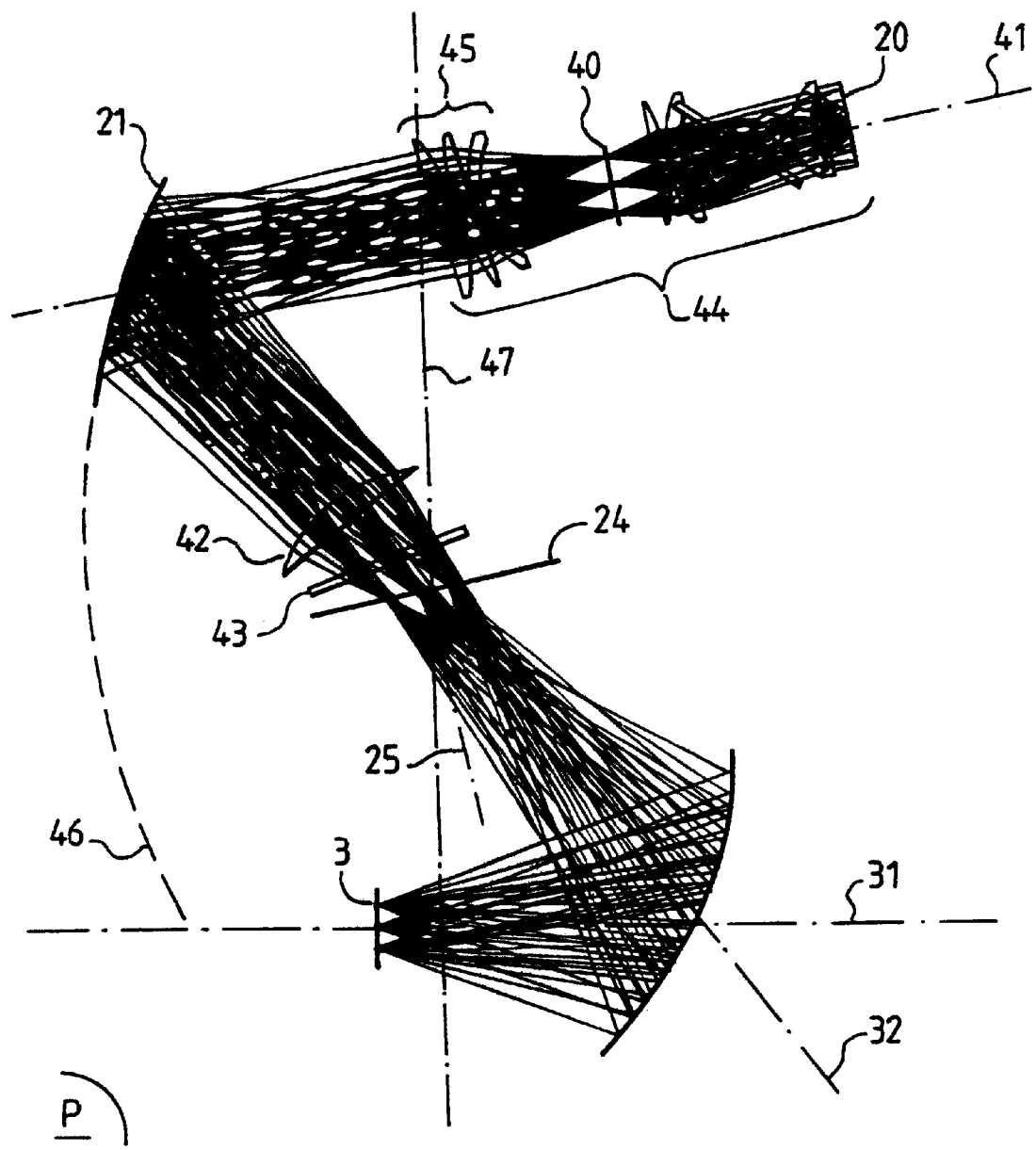
FIG. 4 shows a device according to the invention with an ellipsoidal mirror and a relay optic.

FIG. 4 shows the (folded) optical diagram of a device according to the invention with a relay optic. This embodiment of the invention is distinguished from the one described by means of FIGS. 2 and 3 since the aspherical mirror 21 here has a geometrical surface whose intersection with the plane P of symmetry of the unfolded optic, or plane of incidence of the optical axis, is supported by an ellipse 46.

A power set comprising at least one power lens 42 and one diffractive lens 43 is placed between the first pupil image 24 and the aspherical mirror 21. In this embodiment, as in the one shown in the previous figure, a relay optic 44 distances the plane 20 tangential to the imager from the aspherical mirror 21. A second pupil image 40 is observed. This image is seen by the aspherical mirror 21 through a set of lenses 45.

The surface of the mirror 21 is a part of an ellipsoid. Most usually, this surface has a symmetry of revolution. The axis of revolution 47 is preferably located in the plane P of incidence of the optical axis.

The axis of revolution of the ellipsoid identical to one of the principal axes of the ellipse 46 defines an ellipsoidal mirror.

The axis of revolution 47 is such that the aspherical mirror 21 converts the first pupil image 24 tilted on the optical axis 32 into a second pupil image 40 substantially perpendicular to the optical axis 41 on which it is located.

The aspherical mirror 21 sees the first pupil image 24 through the power set 42, 43 and it sees the second pupil image 40 through the group of lenses 45.

The ellipsoid of revolution has two focal points at finite distance. The focal points of the ellipsoidal mirror 21 correspond preferably to the positions around which the pupil images 24, 40 are seen by this mirror. The pupil images 24, 40 are said to be conjugated by the aspherical mirror 21.

The ellipsoidal mirror is completely stigmatic. It has the advantage of providing for good conjugation of surfaces placed in the vicinity of its focal points. It is more difficult to manufacture than a mirror that follows the shape of a paraboloid. It is therefore more costly, but a device according to the invention comprising an ellipsoidal mirror is on the whole more efficient.

The mirror 1 which hitherto has been most often described as a spherical mirror may equally well be a concave mirror with a shape close to that of the sphere which also induces a distortion of the image seen by the user corresponding to a tilting of the pupil image with respect to the optical axis. The invention enables the correction of the distortion due to a substantially spherical concave mirror.

The substantially spherical off-axis concave mirror 1 may be semi-transparent. In this case, the light rays emitted by the landscape of the environment in the field of view of the user are transmitted by this mirror and are received by the pupil of the eye simultaneously with the rays reflected by this same mirror and described earlier. The semi-transparent mirror is a combiner. It is therefore a substantially spherical concave combiner used off-axis.

This combiner preferably forms part of a visor to protect the user's eyes and even his face.

A visor according to the invention has at least one substantially spherical concave off-axis reflective part.

In the position of use, the visor is folded down so that the part corresponding to the substantially spherical concave mirror 1 is placed in front of the user's eye. The entire device for presenting collimated images can be integrated into a helmet, for example for an aircraft or helicopter pilot and enables the making of a helmet visor. The device may present only substantially collimated images since, in many practical cases, it is enough to present images focused several metres in front of the user.

Figure 5:
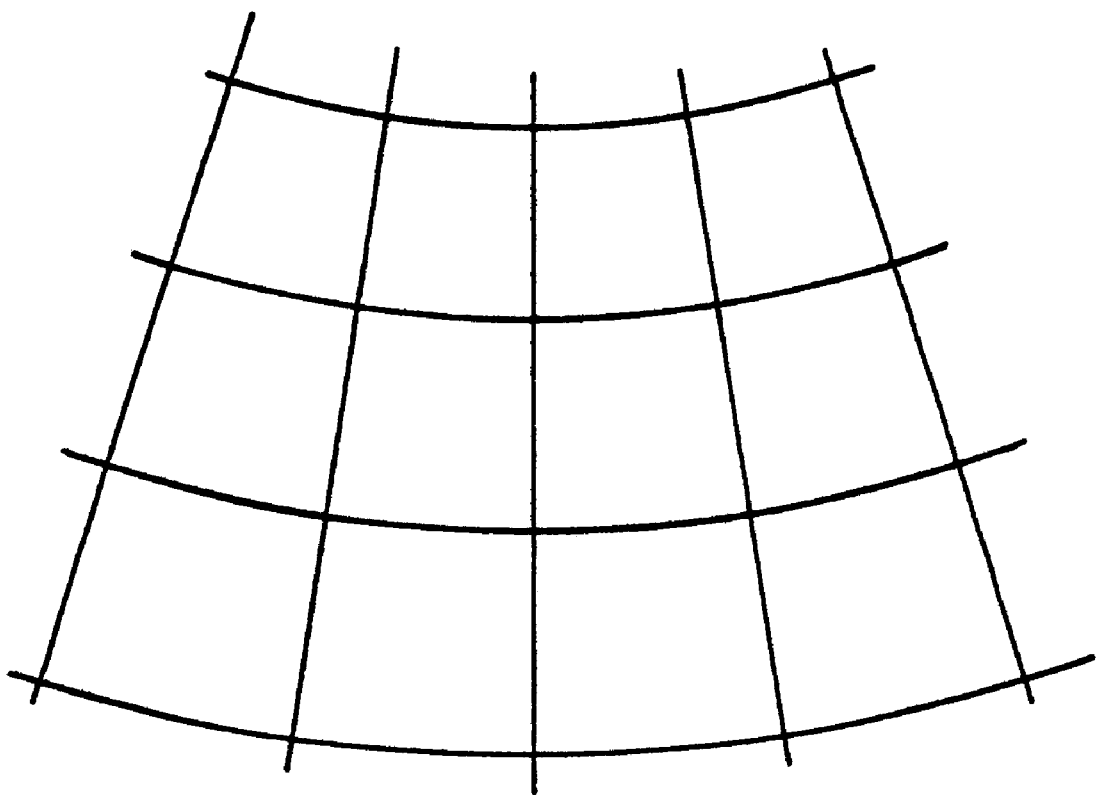
FIG. 5 shows the distortion that is corrected by the invention.

The distortion of an image exhibiting a grid pattern leads to the deformation of the grid pattern. The off-centring distortion of the second kind which corresponds to the pupil spherical aberration induced by the reflection on the substantially spherical off-axis concave mirror 1 is represented in FIG. 5. This distortion gives the impression that the grid pattern is being seen in perspective.

The images presented to the user, and whose distortion inherent in the off-axis substantially spherical concave visor is corrected, are particularly advantageous for a helmet visor since they comply with the real dimensions of the objects shown. This being useful when the visor presents an image superimposed on the direct view and is even more so when, for the user, the image presented substitutes for the direct view for example in the event of poor visibility or in the event of a precise simulation of the environment. The correction of this distortion has the advantage of enabling the user to make a good assessment of distances on the image that he observes, and of enabling him for example to pilot by night without positioning errors.

What is claimed is:

1. An optical device for presenting collimated images through a pupil of an eye of a user, comprising:

an imager;

a substantially spherical off-axis concave mirror, in which a path of a ray passing through a center of the pupil of the eye and a center of the imager forms intersecting optical axes, said substantially spherical concave mirror being tilted with respect to a first axis of the intersecting optical axes between said center of the pupil and said substantially spherical concave mirror; and an aspherical concave mirror tilted on a second axis of the intersecting optical axes corresponding to a reflection path of the first axis, wherein an intersection of the aspherical concave mirror with a plane of incidence of the second optical axis is a curve with a variable radius of curvature so as to correct a distortion of an image presented to the user, said distortion being due to the substantially spherical concave mirror.

2. The device according to claim 1, wherein along the curve, the variation of the radius of curvature is monotonic.

3. The device according to claim 2, wherein the curve is a parabola or an ellipse.

4. The device according to claim 1, wherein an optical surface of the aspherical mirror is supported by a paraboloid.

5. The device according to claim 4, wherein the optical surface of the aspherical mirror is supported by a paraboloid of revolution.

6. The device according to claim 1, wherein an optical surface of the aspherical mirror is supported by an ellipsoid.

7. The device according to claim 6, wherein the optical surface of the aspherical mirror is supported by an ellipsoid of revolution.

8. The device according to claim 5, wherein an axis of revolution of a surface of revolution is substantially parallel to a normal to a plane tangential to a first pupil image that the substantially spherical concave mirror gives of the pupil of the eye.

9. The device according to claim 5, further comprising:

a power set placed between the substantially spherical concave mirror and the aspherical mirror, wherein an image of the pupil of the eye given by the substantially spherical concave mirror is seen by the aspherical concave mirror through the power set in a conjugated mode.

10. The device according to claim 5, wherein the surface of the aspherical mirror is a part of a paraboloid and the aspherical mirror sees, substantially at infinity, a first pupil image that the substantially spherical concave mirror forms of the pupil of the eye.

11. The device according to claim 7, wherein when the surface of the aspherical mirror rests on the ellipsoid, the aspherical mirror sees, in the vicinity of one of its focal points, a first pupil image that the substantially spherical concave mirror forms of the pupil of the eye.

12. The device according to claim 1, wherein the substantially spherical concave mirror is semi-transparent.

13. The device according to claim 1, wherein the optical device is a helmet visor.

14. The device according to claim 2, wherein an optical surface of the aspherical mirror is supported by a paraboloid.

15. The device according to claim 14, wherein the optical surface of the aspherical mirror is supported by a paraboloid of revolution.

16. The device according to claim 2, wherein an optical surface of the aspherical mirror is supported by an ellipsoid.

17. The device according to claim 16, wherein the optical surface of the aspherical mirror is supported by an ellipsoid of revolution.

18. The device according to claim 15, wherein an axis of revolution of a surface of revolution is substantially parallel to a normal to a plane tangential to a first pupil image that substantially spherical concave mirror gives of the pupil of the eye.

19. The device according to claim 17, further comprising:

a power set placed between the substantially spherical concave mirror and the aspherical mirror, wherein an image of the pupil of the user's eye given by the substantially spherical mirror is seen by the spherical concave mirror through the power set in a conjugated mode.

20. The device according to claim 8, wherein the surface of the aspherical mirror is a part of a paraboloid and the aspherical mirror sees, substantially at infinity, a first pupil image that the substantially spherical concave mirror forms of the pupil of the eye.

21. The device according to claim 8, wherein when the surface of the aspherical mirror rests on the ellipsoid, the aspherical mirror sees, in the vicinity of one of its focal points, a first pupil image that the substantially spherical concave mirror forms of the pupil of the eye.

* * * * *